(12) United States Patent
Okada

(10) Patent No.: US 8,256,252 B2
(45) Date of Patent: Sep. 4, 2012

(54) STEERING LOCK DEVICE

(75) Inventor: Takahiro Okada, Kanagawa-ken (JP)

(73) Assignee: Alpha Corporation, Yokohama-shi, Kanagawa-ken (JP)

( * ) Notice: Subject to any disclaimer, the term of this patent is extended or adjusted under 35 U.S.C. 154(b) by 0 days.

(21) Appl. No.: 13/057,060

(22) PCT Filed: Aug. 3, 2009

(86) PCT No.: PCT/JP2009/063741
§ 371 (c)(1),
(2), (4) Date: Feb. 1, 2011

(87) PCT Pub. No.: WO2010/016458
PCT Pub. Date: Feb. 11, 2010

(65) Prior Publication Data
US 2011/0132048 A1 Jun. 9, 2011

(30) Foreign Application Priority Data
Aug. 5, 2008 (JP) ................ P2008-201930

(51) Int. Cl.
*B60R 25/02* (2006.01)

(52) U.S. Cl. ............. 70/182; 70/183; 70/190; 70/192; 70/209; 70/237; 70/239; 70/252; 70/253; 70/254; 292/170

(58) Field of Classification Search ........... 70/182–192, 70/252–254, 201, 209, 237, 239; 292/170
See application file for complete search history.

(56) References Cited

U.S. PATENT DOCUMENTS

| | | | | |
|---|---|---|---|---|
| 5,036,686 A * | 8/1991 | Ichinose | ................ | 70/186 |
| 6,125,671 A * | 10/2000 | Suzuki | ................ | 70/186 |
| 6,694,785 B1 * | 2/2004 | Hsieh | ................ | 70/209 |
| 6,755,058 B2 * | 6/2004 | Zillmann | ................ | 70/252 |
| 7,065,993 B2 * | 6/2006 | Fukushima | ................ | 70/252 |
| 7,870,768 B2 * | 1/2011 | Tanioka et al. | ................ | 70/186 |
| 2002/0029595 A1 * | 3/2002 | Limburg et al. | ................ | 70/186 |
| 2008/0087056 A1 * | 4/2008 | Tsukazaki | ................ | 70/182 |
| 2008/0178643 A1 * | 7/2008 | Okuno et al. | ................ | 70/184 |
| 2009/0064739 A1 * | 3/2009 | Trischberger et al. | ................ | 70/237 |
| 2009/0084145 A1 * | 4/2009 | Sugimoto | ................ | 70/186 |

FOREIGN PATENT DOCUMENTS

| | | |
|---|---|---|
| JP | 10-138870 A | 5/1998 |
| WO | 2006/092186 A2 | 9/2006 |

* cited by examiner

*Primary Examiner* — Lloyd Gall
*Assistant Examiner* — Ifeolu Adeboyejo
(74) *Attorney, Agent, or Firm* — The Nath Law Group; Jerald L. Meyer; Stanley N. Protigal

(57) ABSTRACT

A steering lock device includes a lock member that is slidable between a lock position and an unlock position, and a slider that is disposed slidably in a direction perpendicular to a moving direction of the lock member. A sloped portion that is linearly sloped toward the steering shaft along a slide direction of the slider is provided on at least one of the lock member and the slider. The lock member is shifted between the lock position and the unlock position by the sloped portion in response to sliding of the slider. According to the steering lock device, downsizing can be brought due to its short height along a stroke direction of the lock member and cost reduction by commoditization of its main components can be achieved.

5 Claims, 11 Drawing Sheets

FIG. 10
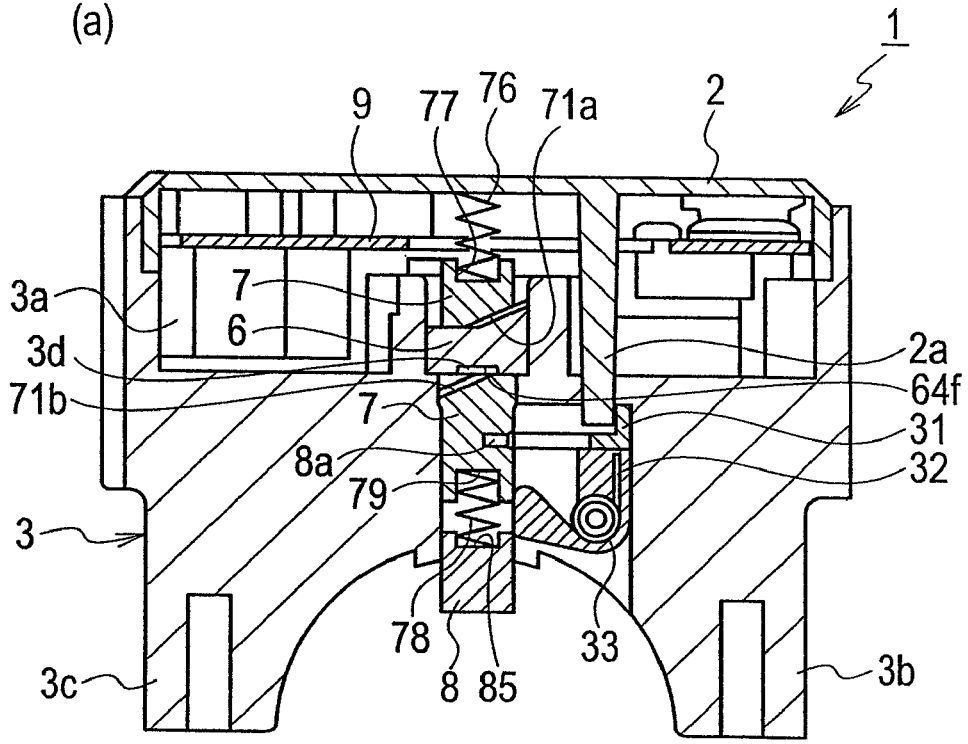
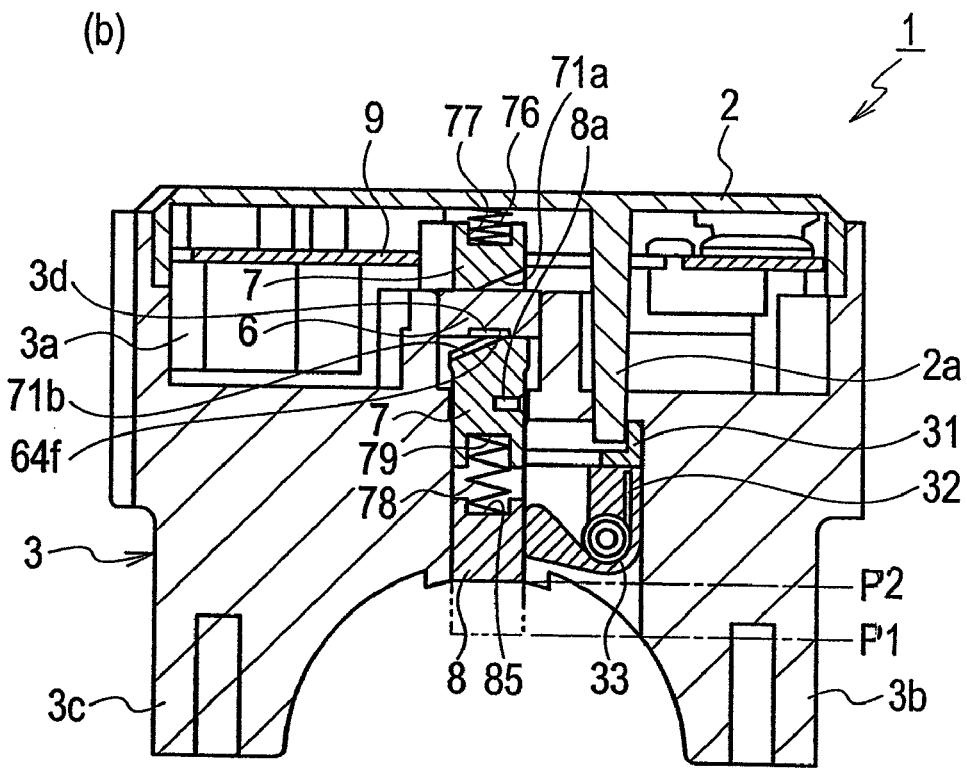

STEERING LOCK DEVICE

This is a National Phase Application filed under 35 U.S.C. 371 as a national stage of PCT/JP2009/063741, filed Aug. 3, 2009, an application claiming the benefit from the Japanese patent Application No. P2008-201930, filed Aug. 5, 2008 the content of each of which is hereby incorporated by reference in its entirety.

TECHNICAL FIELD

The present invention relates to a steering lock device that locks rotation of a steering shaft of an automobile.

BACKGROUND ART

As a conventional steering lock device for an automobile, one disclosed in WO2006/092186 (Patent Document 1) is known. A configuration of this steering lock device 100 is shown in FIG. 17 to FIG. 19. The steering lock device 100 includes a lock member 103, a worm wheel 107, and a pin 108. The lock member 103 is urged toward a steering shaft 102 of an automobile by a coil spring 101, and capable of being engaged with the steering shaft 102. The worm wheel 107 is coupled with a motor 104 via a worm gear 105, and having a slope 106 spirally inclined along an axial direction. The pin 108 moves along the slope 106 along with rotation of the worm wheel 107.

The motor 104 is rotated to its lock direction when the automobile is parked, so that the worm wheel 107 is rotated its lock direction via the worm gear 105. The pin 108 slides along the slope 106 along with the rotation of the worm wheel 107, so that the lock member 103 shifts from its unlock position to its lock position. As a result, an end of the lock member 103 is engaged with the steering shaft 102 to prohibit rotation of the steering shaft 102, and thereby it is made impossible to drive the automobile.

After that, the motor 104 is rotated to its unlock direction, so that the worm wheel 107 is rotated its unlock direction via the worm gear 105. The pin 108 slides along the slope 106 along with the reverse rotation of the worm wheel 107, so that the lock member 103 shifts from its lock position to its unlock position. As a result, an engagement between the lock member 103 and the steering shaft 102 is released to enable the rotation of the steering shaft 102, and thereby the automobile is made possible to be steered.

SUMMARY OF THE INVENTION

However, since it is needed to provide the spiral slope 106 on the worm wheel 107 in the above-mentioned steering lock device 100, a size of the worm wheel 107 along its axial-direction (its height along a stroke direction of the lock member 103) must become large. In addition, a specification of the slope 106 must be changed in order to adapt various specifications of a stroke amount of the lock member 103 and a driving force need for its stroke. In this case, its production cost must become high, because it is needed to prepare different specifications of the worm wheel 107.

Therefore, an object of the present invention is to provide a steering lock device that can be downsized due to its short height along a stroke direction of its lock member and can achieve cost reduction by commoditization of its main components.

A first aspect of the present invention provides a steering lock device that includes a lock member that is slidable between a lock position at which the lock member engages with a steering shaft to prohibit a rotation of the steering shaft and an unlock position at which the lock member doesn't engage with the steering shaft to allow the rotation of the steering shaft, and urged toward the steering shaft by an urging member; and a slider that is disposed slidably in a direction perpendicular to a moving direction of the lock member. A sloped portion that is linearly sloped toward the steering shaft along a slide direction of the slider is provided on at least one of the lock member and the slider. The lock member is shifted between the lock position and the unlock position by the sloped portion in response to sliding of the slider.

In the above steering lock device, the slider slides in the direction (its unlock direction) perpendicular to the moving direction of the lock member under a locked state of the lock member, so that the lock member is moved by the sloped portion so as to be distanced away from the steering shaft and thereby shifts to the unlock position for allowing the rotation of the steering shaft. In addition, the slider slides in its lock direction under an unlocked state of the lock member, so that the lock member is moved toward the steering shaft by the sloped portion and thereby shifts to the lock position and engages with the steering shaft by an urging force of the urging member to prohibit the rotation of the steering shaft.

Further, since the lock member is shifted in response to sliding of the slider, it is not needed to provide a spiral slope on a worm wheel to shift the lock member as in a conventional way and thereby a height along a shifting direction of the lock member can be made low to achieve downsizing.

In addition, since a shifting amount of the lock main body and a driving force need for its shifting can be changed only by replacing the slider, cost reduction by commoditization of main components can be achieved.

A second aspect of the present invention provides a steering lock device that includes a lock member that is slidable between a lock position at which the lock member engages with a steering shaft to prohibit a rotation of the steering shaft and an unlock position at which the lock member doesn't engage with the steering shaft to allow the rotation of the steering shaft; and a slider that penetrates through the lock member and is disposed slidably in a direction perpendicular to a moving direction of the lock member between a lock end and an unlock end. A locking sloped portion that is linearly sloped toward the steering shaft along a slide direction of the slider is provided on at least one of contact portions of the lock member and the slider under the slider sliding toward the lock end. In addition, an unlocking sloped portion that is linearly sloped toward the steering shaft along the slide direction of the slider is provided on at least one of the contact portions. The lock member is shifted to the lock position due to a slope of the locking sloped portion while the slider slides to the lock end. In addition, the lock member is shifted to the unlock position due to a slope of the unlocking sloped portion while the slider slides to the unlock end.

In the above steering lock device, the slider slides in the direction (its unlock direction) perpendicular to the moving direction of the lock member under a locked state of the lock member, so that the lock member is moved by the unlocking sloped portion so as to be distanced away from the steering shaft and thereby shifts to the unlock position for allowing the rotation of the steering shaft. In addition, the slider slides in its lock direction under an unlocked state of the lock member, so that the lock member is moved toward the steering shaft by the locking sloped portion and thereby shifts to the lock position and engages with the steering shaft by an urging force of the urging member to prohibit the rotation of the steering shaft.

Further, since the lock member is shifted in response to sliding of the slider, it is not needed to provide a spiral slope on a worm wheel to shift the lock member as in a conventional way and thereby a height along a shifting direction of the lock member can be made low to achieve downsizing.

In addition, since a shifting amount of the lock main body and a driving force need for its shifting can be changed only by replacing the slider, cost reduction by commoditization of main components can be achieved.

Further, although the lock member moves to engage with the steering shaft in response to sliding of the slider and thereby the rotation of the steering shaft is prohibited, the lock member can be forcibly moved by the slider even if the lock member jams while moving and thereby can be moved unfailingly.

Here, it is preferable that the steering lock device further includes a rack that is disposed on the slider along the slide direction of the slider; and a worm wheel that meshes with the rack and rotates toward an unlock direction or a lock direction by driving of a drive source.

According to this, since the rack disposed on the slider is driven by rotating the worm wheel toward the unlock direction or the lock direction due to driving of the drive source, the slider can be smoothly slid.

Alternatively, it is preferable that the steering lock device further includes a detection unit that operates in response to sliding of the slider and a position of the lock member is detected by an operation of the detection unit.

According to this, since the shifting position of the lock member is detected by the detection unit that operates in response to sliding of the slider, the detection unit can be disposed more easily than a case where the position of the lock member is detected directly by a detection unit.

Further, it is preferable that the detection unit is disposed along a side surface of the slider.

According to this, since the detection unit is disposed along the side surface of the slider, a height of the slider (height along the sifting direction of the lock member) can be restricted.

Alternatively, it is preferable that the slide direction of the slider is skew to an axial direction of the steering shaft.

According to this, since the slide direction of the slider is made "skew" to the axial direction of the steering shaft, a height of the slider to be guided (height along the sifting direction of the lock member) can be restricted. In addition, since the slide direction of the slider is made "skew" to the axial direction of the steering shaft, a stroke ratio of the slider can be made relatively longer than a case where the slide direction of the slider and the axial direction of the steering shaft are make parallel to each other in a space. Therefore, downsizing of the steering lock device can be achieved. In addition, a shifting amount of the lock member can be prolonged by setting the sloped portion of the slider longer, or a drive force need for shifting the lock member can be increased by setting a sloped angle of the sloped portion of the slider smaller.

BRIEF DESCRIPTION OF THE DRAWINGS

FIG. 10 (a) is a cross-sectional view (locked state) taken along a line X-X shown in FIG. 9, and (b) is a cross-sectional view (unlocked state) taken along the line X-X shown in FIG. 9.

DESCRIPTION OF EMBODIMENT(S)

Figure 1:
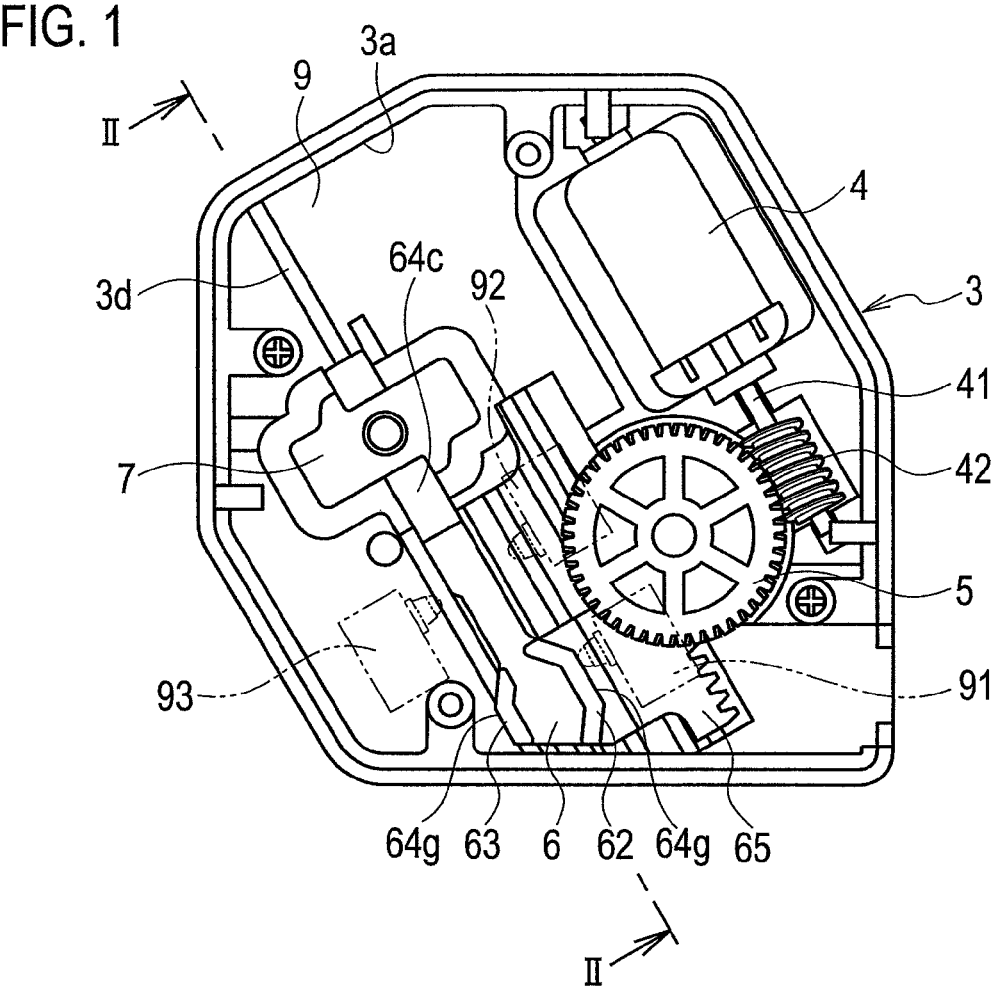
FIG. 1 is a plan view showing a steering lock device (locked state) according to an embodiment of the present invention.
Figure 2:
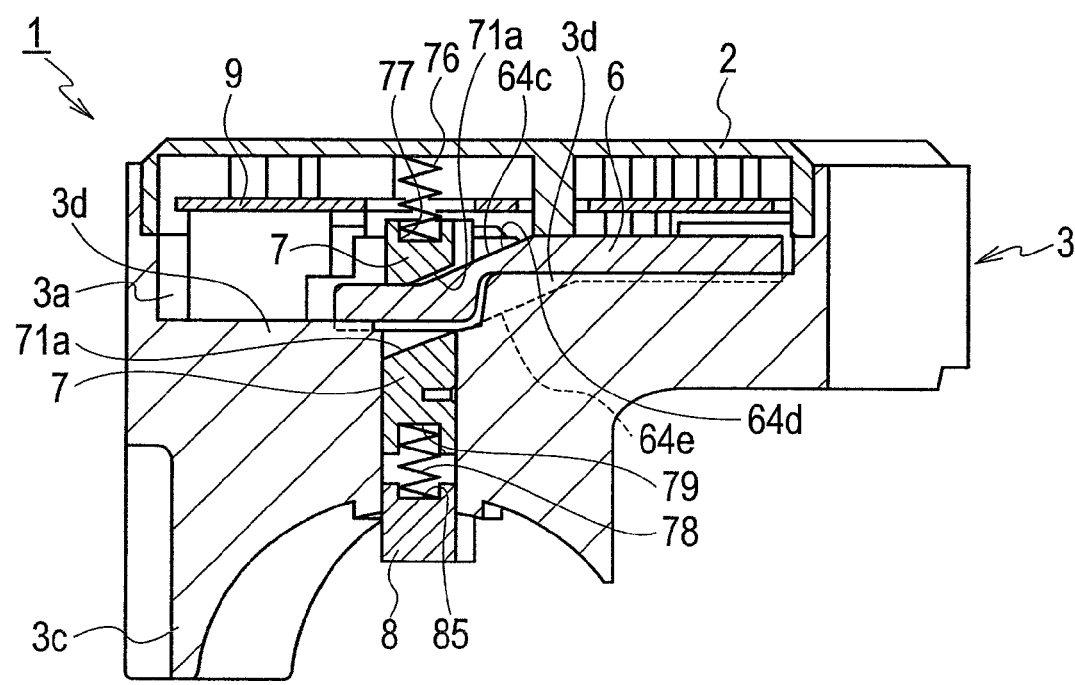
FIG. 2 is a cross-sectional view taken along a line II-II shown in FIG. 1.
Figure 3:
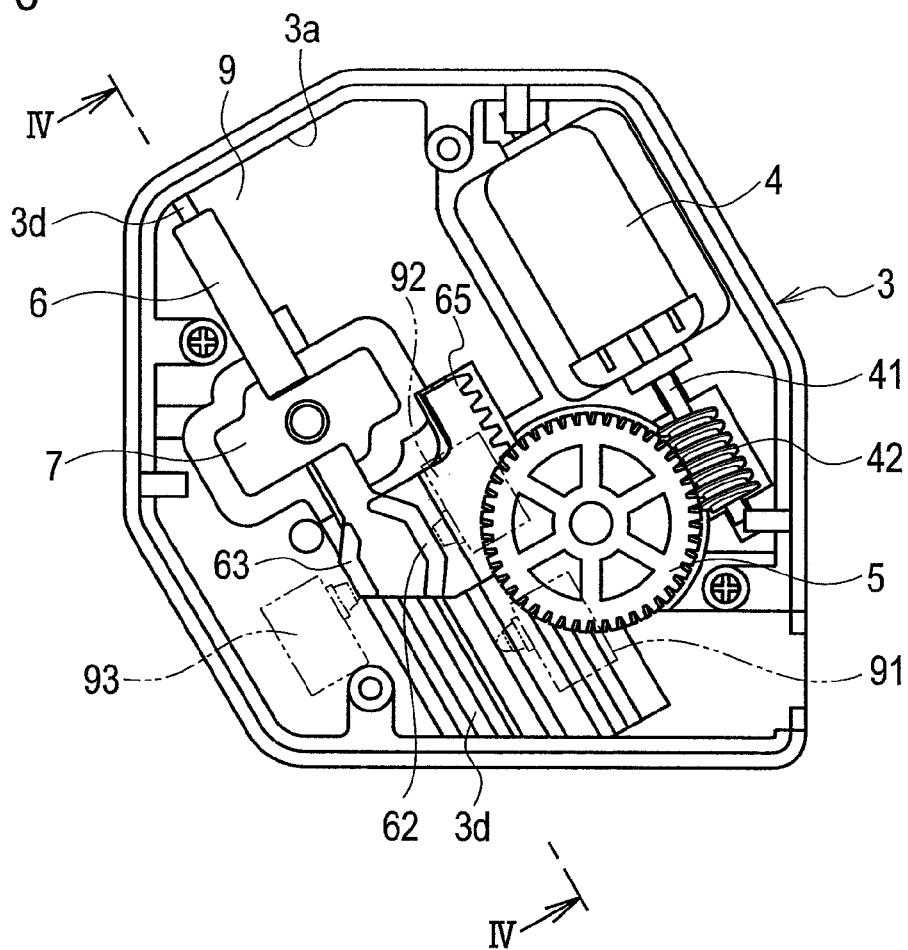
FIG. 3 is a plan view showing the steering lock device (unlocked state) according to the embodiment of the present invention.
Figure 4:
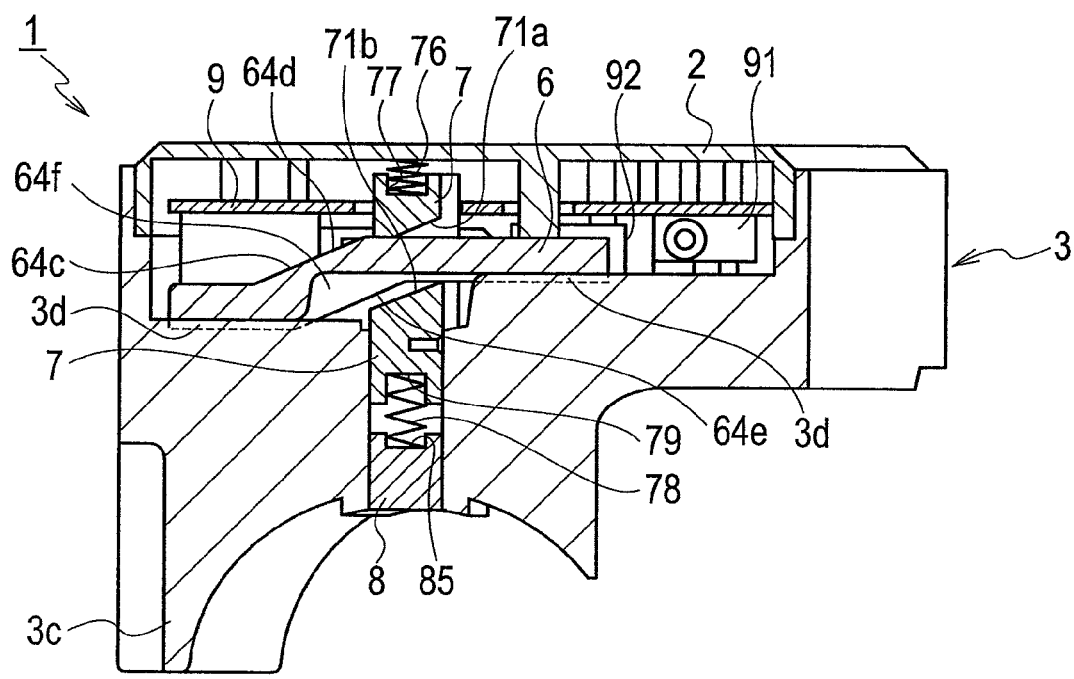
FIG. 4 is a cross-sectional view taken along a line IV-IV shown in FIG. 3.
Figure 5:
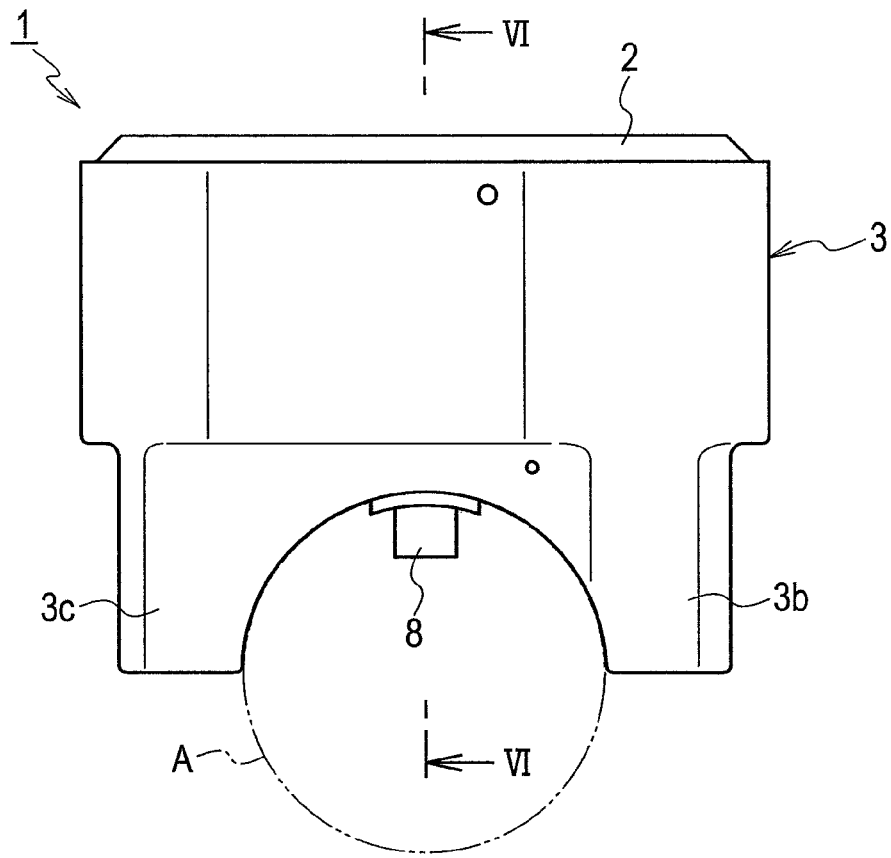
FIG. 5 is a front view showing the steering lock device (locked state) according to the embodiment of the present invention.
Figure 6:
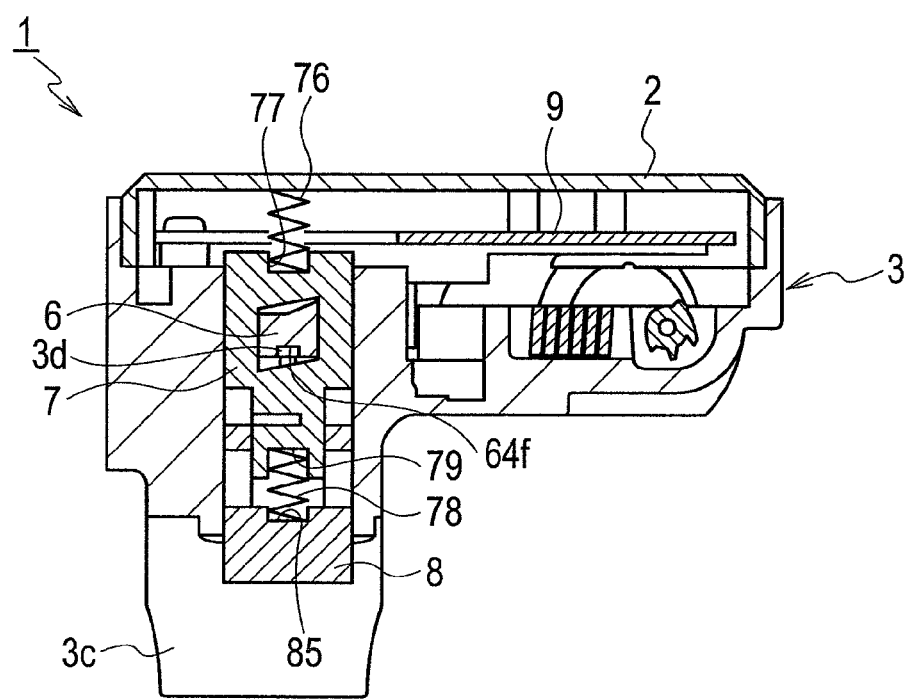
FIG. 6 is a cross-sectional view taken along a line VI-VI shown in FIG. 5.
Figure 7:
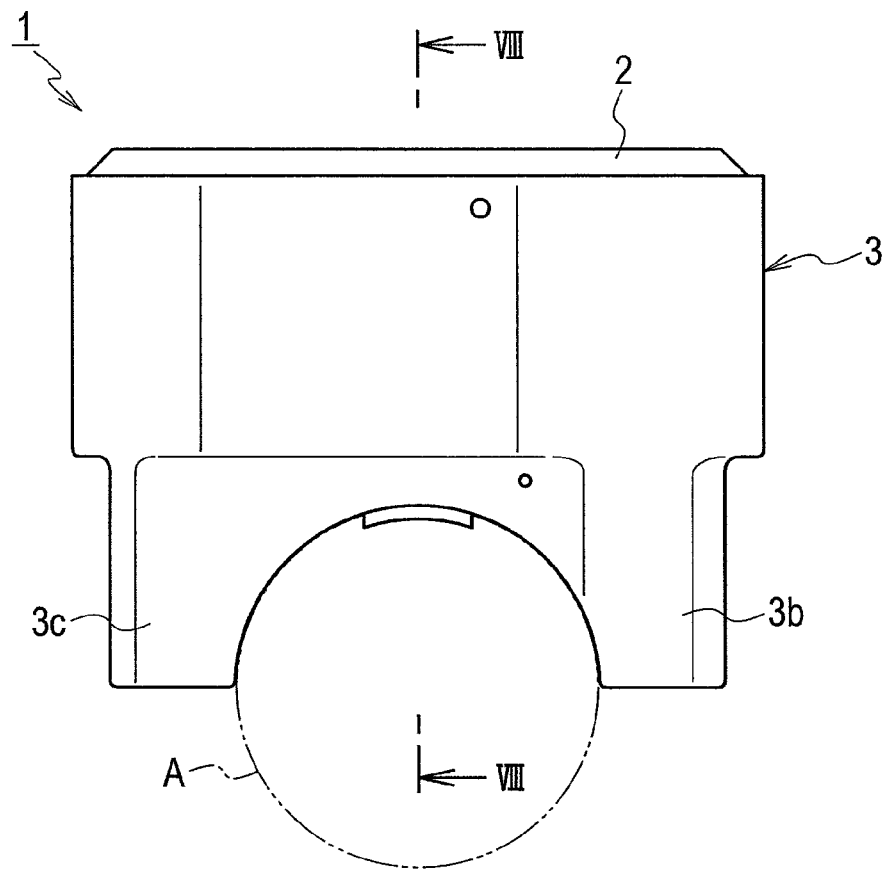
FIG. 7 is a front view showing the steering lock device (unlocked state) according to the embodiment of the present invention.
Figure 8:
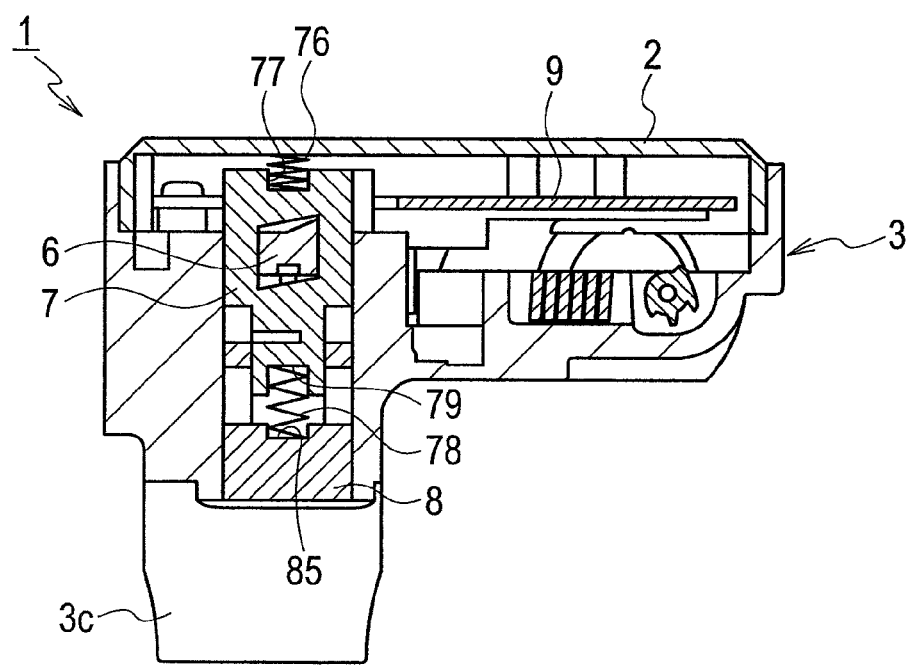
FIG. 8 is a cross-sectional view taken along a line VIII-VIII shown in FIG. 7.
Figure 9:
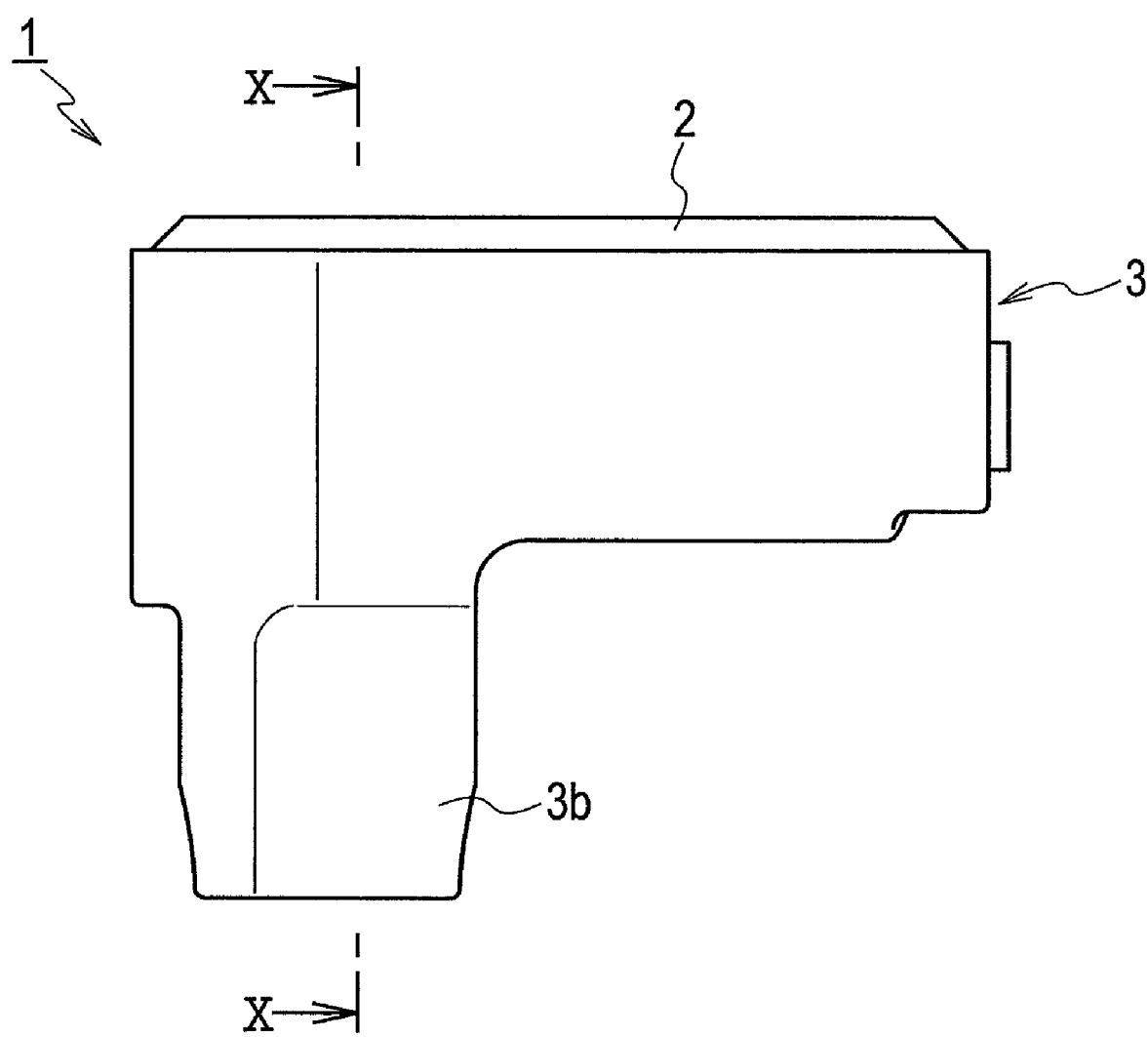
FIG. 9 is a side view showing the steering lock device according to the embodiment of the present invention.
Figure 11:
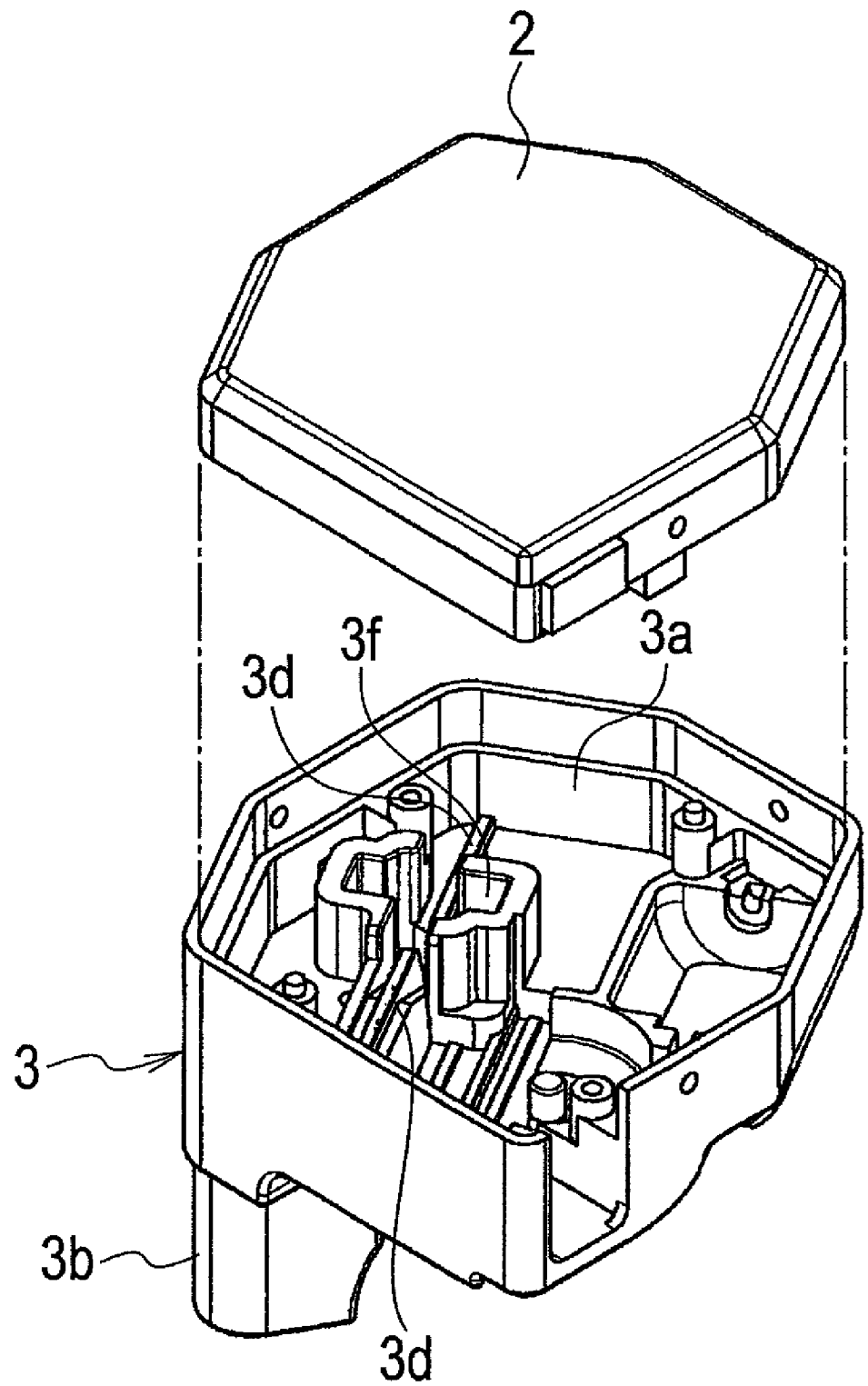
FIG. 11 is an exploded perspective view showing a casing and a cover in the embodiment of the present invention.

Hereinafter, a steering lock device according to an embodiment of the present invention will be explained with reference to FIG. 1 to FIG. 16. Note that each of FIG. 1 and FIG. 3 shows an inside of the steering lock in a state where a cover is removed therefrom.

As shown in FIG. 1 to FIG. 16, the steering lock device 1 according to the present embodiment includes a cover 2 and a housing 3 that are coupled with each other (see FIG. 11), and is attached to a steering column device A (see FIG. 5 and FIG. 7) that houses a steering shaft (not shown).

A component housing chamber 3a that is opened toward one side (e.g. upward in FIG. 2) is formed in an inside of the housing 3. The housing 3 includes a pair of legs 3b and 3c that is arranged so as to lie over the steering column device A (see FIG. 5 and FIG. 7). A motor 4 as a drive source, a worm wheel 5, a slider 6, a hanger member 7, a lock main body 8, and a printed circuit board 9 are housed in the housing 3. The worm wheel 5 is rotated toward its unlock direction or its lock direction by the motor 4. The slider 6 slides in a direction perpendicular to the lock main body 8 by being driven by the motor 4 via the worm wheel 5. The hanger member 7 engages with the slider 6. The lock main body 8 is coupled with the hanger member 7. The hanger member 7 and the lock main body 8 constitute a lock member. An end of the lock main body 8 can be protruded outward from a bottom of the housing 3 to be engaged with the steering shaft. The printed circuit board 9 is disposed at an upper side of these components.

A guide rail 3*d* for guiding an after-mentioned groove 64*f* of the slider 6 is formed on a bottom of the component housing chamber 3*a*. The guide rail 3*d* is "skew" to an axial direction of the steering shaft, and its angle made with the axial direction (straight line L) is set to a predetermined angle α (>0) (see FIG. 12). The slider 6 can slide between a lock end E1 (state shown in FIG. 1) and an unlock end E2 (state shown in FIG. 3) of the guide rail 3*d* (see FIG. 12). Note that an angle made by two "skew" straight lines is a crossing angle made when one of the straight lines is moved to another of the straight lines so as to intersect with each other with the shortest distance between the two straight lines.

Figure 12:
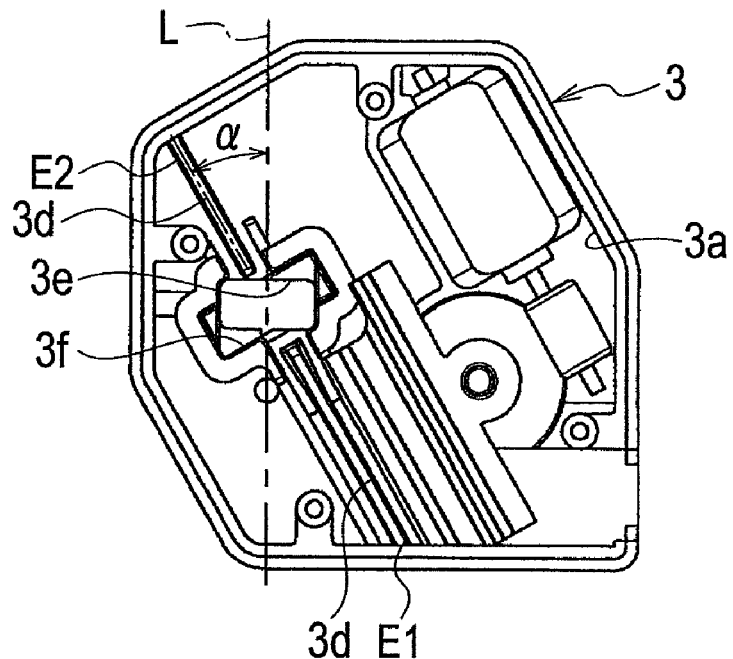
FIG. 12 is a plan view of the casing in the embodiment of the present invention.

On the housing 3, formed is a through hole that extends along a direction perpendicular to the axial direction and penetrates from the bottom of the component housing chamber 3*a* toward the steering column device A. The through hole is formed of a rectangular first hole 3*e* and a rectangular second hole 3*f* (see FIG. 12). The lock main body 8 and the hanger member 7 are inserted into the first hole 3*e*. The hangar member 7 is inserted into the second hole 3*f*. As shown in FIG. 12, the first hole 3*e* occupies a part near the steering column device A of the through hole. The first hole 3*e* has a relatively small cross-sectional area, and is elongated in a direction perpendicular to the axial direction (the straight line L). The second hole 3*f* occupies a side near the component housing chamber 3*a* of the through hole. The second hole 3*f* has a relatively large cross-sectional area, and is elongated in a direction perpendicular to a slide direction (the guide rail 3*d*) of the slider 6.

A boss 2*a* protruding inward from a back surface of the cover 2 is integrally formed on the cover 2 (see FIG. 10(*a*) and FIG. 10(*b*)). In addition, the housing 3 includes a boss plate 31, a boss spring 32, and a boss case 33. The boss plate 31 engages with the boss 2*a*. The boss spring 32 urges the boss plate 31 toward the lock main body 8. The boss case 33 holds the boss spring 32. As shown in FIG. 10(*a*), the boss 2*a* engages with the boss plate 31 in a state where the cover 2 is attached to the housing 3, so that the boss plate 31 is held with distance away from the lock main body 8.

Figure 16:
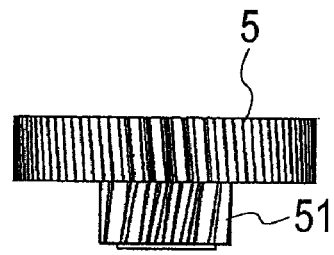
FIG. 16 is a front view showing a worm wheel in the embodiment of the present invention.
Figure 17:
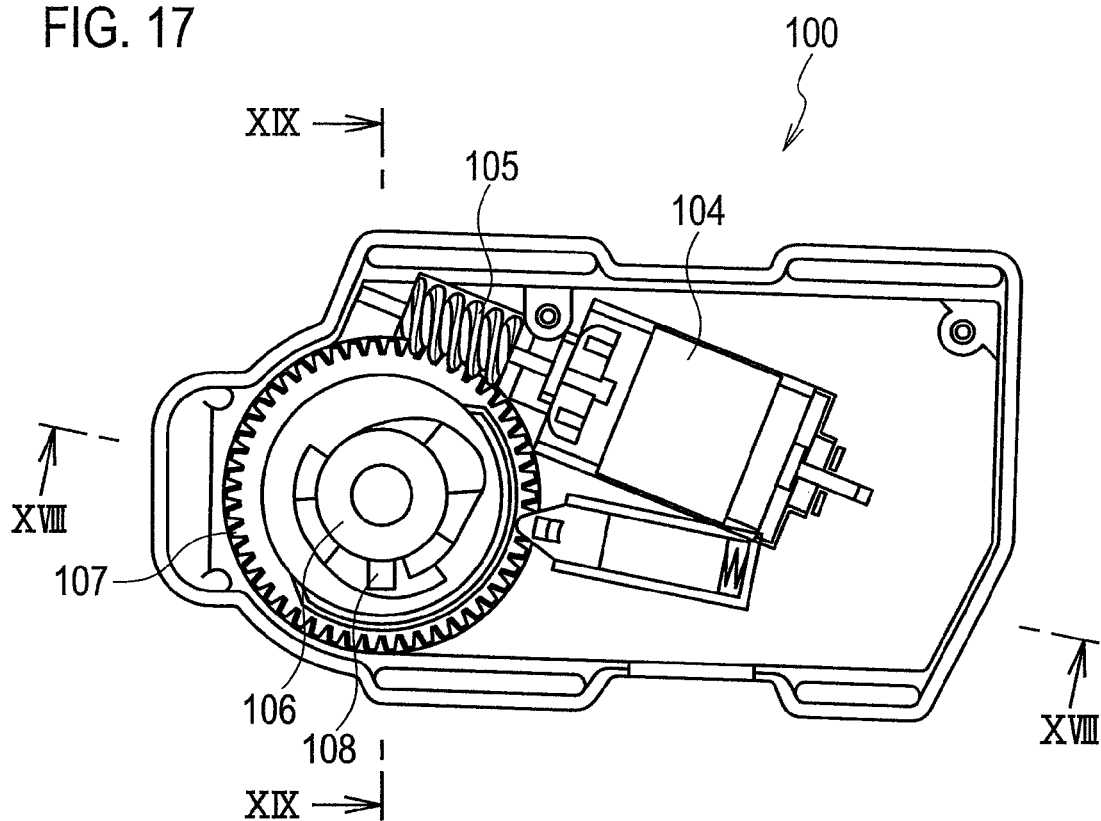
FIG. 17 is a plan view showing a conventional steering lock device.
Figure 18:
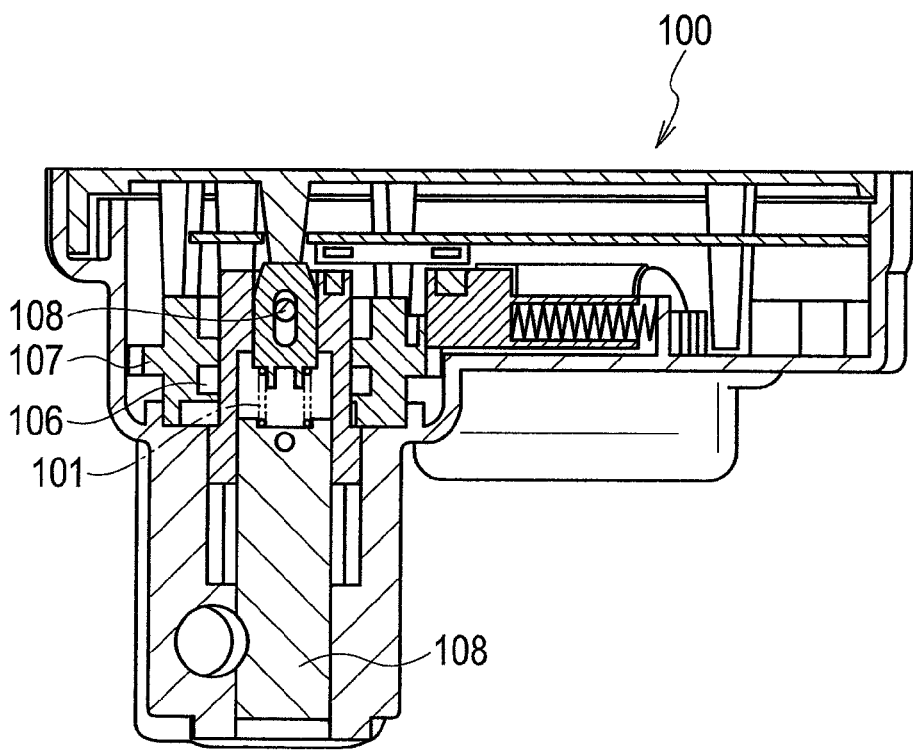
FIG. 18 is a cross-sectional view taken along a line XVIII-XVIII shown in FIG. 17.
Figure 19:
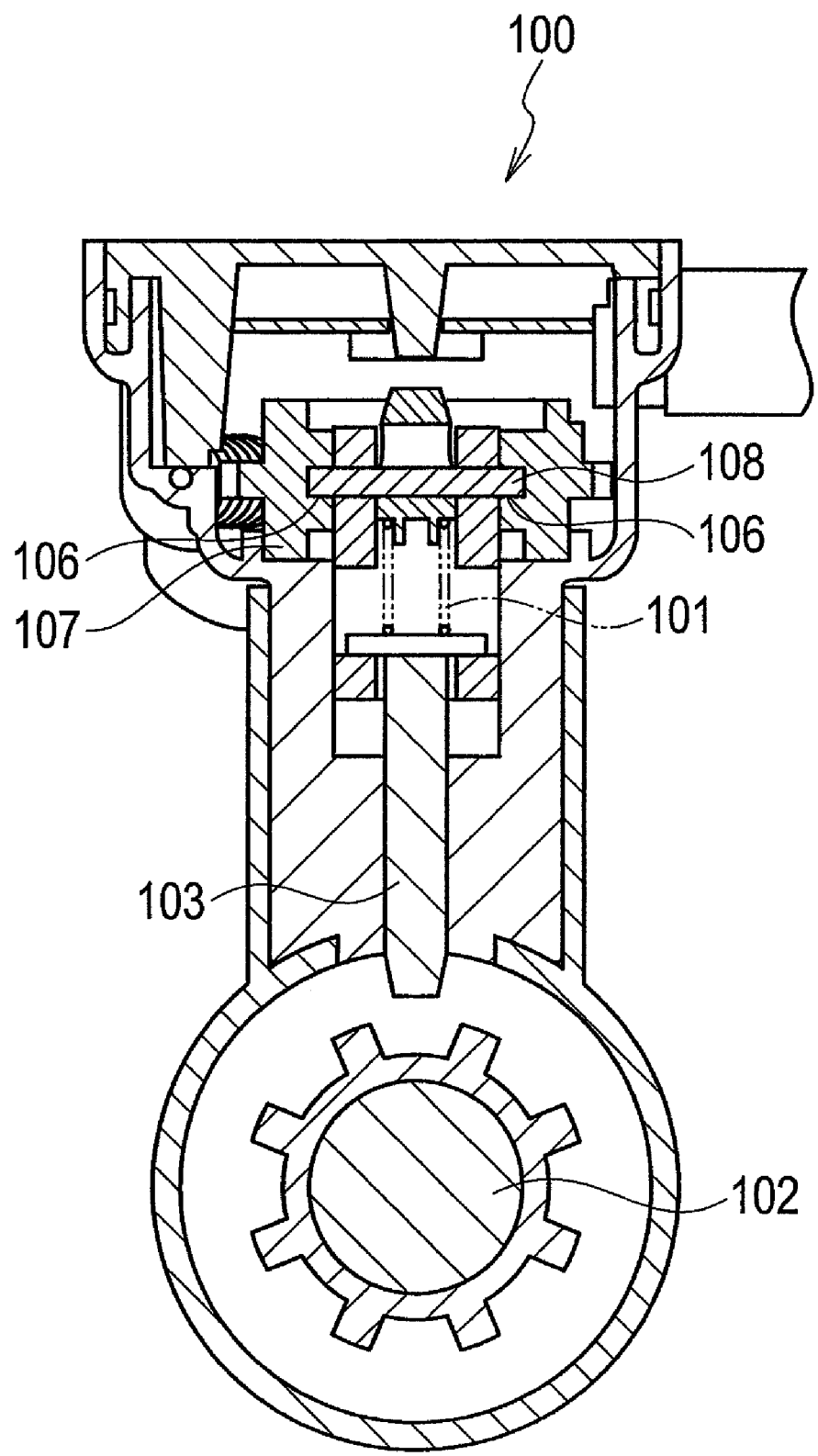
FIG. 19 is a cross-sectional view taken along a line XIV-XIV shown in FIG. 17.

A worm gear 42 that meshes with the worm wheel 5 is fixed to a rotational axis 41 of the motor 4. As shown in FIG. 16, a drive gear 51 that rotates integrally with the worm wheel 5 is provided on the worm wheel 5.

Figure 15:
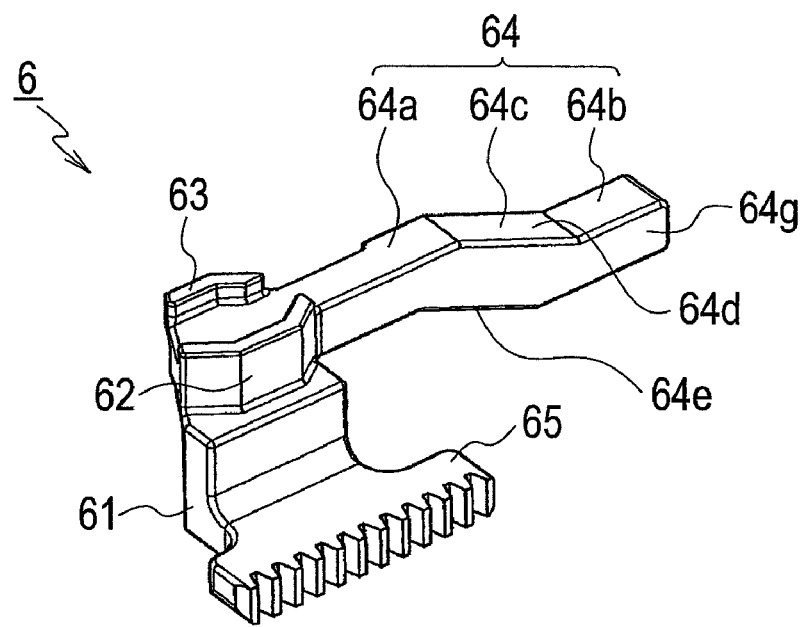
FIG. 15 is a perspective view showing a slider in the embodiment of the present invention.

As shown in FIG. 15, the slider 6 is composed of a base 61, a pair of cams 62 and 63, an arm 64, and a rack 65. The pair of cams 62 and 63 is provided at one end (an upper portion) of the base 61. The arm 64 is extended from the one end of the base 61. The rack 65 is extended at another end (a lower portion) of the base 61 along the slide direction of the slider 6. The rack meshed with the above-mentioned drive gear 51.

The arm 64 is integrally constituted of a base portion 64*a*, an end portion 64*b*, and a sloped potion 64*c* (sloped portion of the slider 6). The base portion 64*a* and the end portion 64*b* extend along the slide direction of the slider 6, respectively. The sloped portion 64*c* interposes between the base portion 64*a* and the end portion 64*b*. The sloped portion 64*c* is tilted so as to gradually get close to the steering shaft from the base portion 64*a* toward the end portion 64*b* (see FIG. 2 and FIG. 4).

In addition, the groove 64*f* is formed on a surface of the arm 64 on a side toward the housing 3 (an under side in FIG. 15) along a longitudinal direction of the arm 64. The guide rail 3*d* is set in the groove 64*f*, so that the slider 6 is guided to slide by the guide rail 3*d*. The lock main body 8 is moved by the sloped portion 64*c* while the slider 6 slides, and thereby the lock main body 8 shifts between its lock position P1 (see FIG. 10(*a*)) for prohibiting rotation of the steering shaft and its unlock position P2 (see FIG. 10(*b*)) for allowing the rotation of the steering shaft. Note that an unlock portion 64*d* (an unlocking sloped portion on the slider 6) is formed on a surface of the sloped portion 64*c* on a side of the cover 2 (an upper side in FIG. 15). In addition, a lock portion 64*e* (a locking sloped portion on the slider 6) is formed on a surface of the sloped portion 64*c* on a side of the housing 3 (an under side in FIG. 15).

Figure 13:
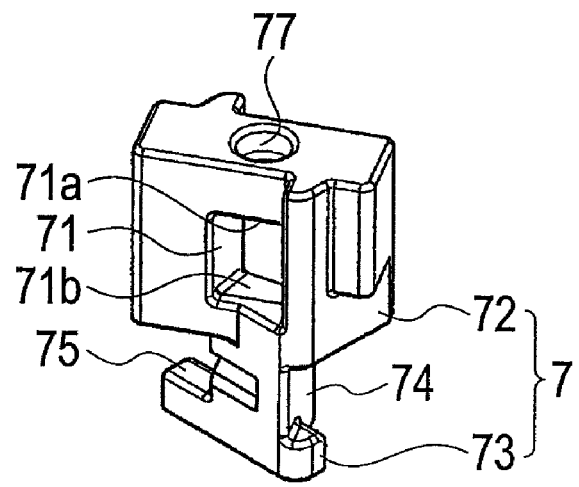
FIG. 13 is a perspective view showing a hanger member in the embodiment of the present invention.

As shown in FIG. 13, the hanger member 7 is constituted of a base 72, and a coupling portion 73. An insertion hole 71 through which the slider 6 is inserted is formed on the base 72. The coupling portion 73 is protruded from a lower end of the base 72, and coupled with the lock main body 8. A longitudinal direction of the base 72 is arranged perpendicularly to the guide rail 3*d*. On the other hand, a longitudinal direction of the coupling portion 73 is arranged perpendicularly to the axial direction of the steering shaft (the straight line L). Cutouts 74 and 75 that catch after-mentioned arms 81 and 82 of the lock main body 8 are formed between the base 72 and the coupling portion 73. A lateral internal width of the insertion hole 71 is set slightly larger than a width of the arm 64 of the slider 6. An unlock portion 71*a* (an unlocking sloped portion on the lock member) at an upper edge of the insertion hole 71. A lock portion 71*b* (a locking sloped portion on the lock member) at a lower edge of the insertion hole 71. Sloped angles of the inner edges (the unlock portion 71*a* and the lock portion 71*b*) of the insertion hole 71 are similar to a sloped angle of the sloped portion 64*c* of the slider 6.

A hole 77 for receiving an end of a first coil spring (urging member) 76 is formed on an end surface (upper surface) of the base 72 on a side of the cover 2. In addition, a hole 79 for receiving an end of a second coil spring 78 is formed on an end surface (under surface) of the coupling portion 73 on a side of the steering column device A (see FIG. 2, FIG. 4 and so on).

Figure 14:
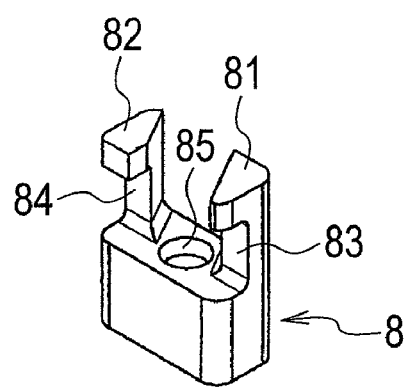
FIG. 14 is a perspective view showing a rod member in the embodiment of the present invention.

As shown in FIG. 14, the pair of arms 81 and 82 that protrude towards the hanger member 7 (upward in FIG. 14) is provided at an end of the lock main body 8. Cutouts 83 and 84 that receive the coupling portion 73 of the hanger member 7 are provided at basal portions of the arms 81 and 82. A hole 85 for receiving another end of the second coil spring 78 is formed on an end surface (under surface) of the lock main body 8 on a side of the cover 2.

Detection switches (detection units) 91 to 93 that operate in response to sliding of the slider 6 are provided on the printed circuit board 9 along side surfaces 64*g* of the slider 6 (see FIG. 1 and FIG. 3). As shown in FIG. 1, when the first detection switch 91 operates due to its contact with the first cam 62 of the slider 6, it is detected that the lock main body 8 is at the lock position P1. In addition, as shown in FIG. 3, when the second detection switch 92 operates due to its contact with the first cam 62 and the third detection switch 93 operates due to its contact with the second cam 63, it is detected that the lock main body 8 is at the unlock position P2. Note that the detection switches 91 to 93 may be either of a contact type (mechanical type) or a non-contact type (e.g. hole sensor). In addition, the number of the detection switches is determined according to required specifications such as steadiness. Since the slide 6 is guided by the guide rail 3*d* and the groove 64*f*, the detection switches 91 to 93 are arranged along the both side surfaces 64*f* of the slider 6.

Next, assembly processes of the steering lock device 1 will be explained. Firstly, the hanger member 7 is coupled with the lock main body 8 from its side. At this time, the coupling portion 73 is caught in the cutouts 83 and 84, and the arms 81 and 82 are caught in the cutouts 74 and 75. In addition, the arm 64 is inserted through the insertion hole 71. The slider 6, the hanger member 7 and the lock main body 8 that have been sub-assembled are housed in the component housing chamber 3a of the housing. At this time, the lock main body 8 and the coupling portion 73 of the hanger member 7 are inserted into the first hole 3e through the second hole 3f. In addition, the base 72 of the hanger member 7 is inserted into the second hole 3f. The base 61 of the slider 6 is disposed on the guide rail 3d in the component housing chamber 3a.

Subsequently, the worm wheel 5 is disposed at a designated position in the component housing chamber 3a. At this time, the drive gear 51 and the rack 65 of the slider 6 are meshed with each other. The motor 4 is disposed in the vicinity of the worm wheel 5, and the worm gear 42 on the rotational axis 41 and the worm wheel 5 are meshed with each other. Further, the printed circuit board 9 is disposed at an upper portion in the component housing chamber 3a, and wirings are applied thereto. After screwing the printed circuit board 9 in the component housing chamber 3a, the cover 2 is attached to the housing 3 to cover the component housing chamber 3a.

Subsequently, the boss plate 31 is inserted into the inside of the housing 3 from a bottom side of the housing, and then the boss plate 31 and the boss 2a of the cover 2 are engaged with each other. In addition, the boss spring 32 and the boss case 33 are inserted into the housing 3.

After assembling the steering lock device 1 as explained above, the pair of legs 3b and 3c is attached to the steering column device A so as to lie over the steering column device A.

Next, behaviors of the steering lock device 1 will be explained. When locking by the lock main body 8 as shown in FIG. 1, FIG. 2, FIG. 5, FIG. 6 and FIG. 10(a), the slider 6 is at the lock end E1 of the guide rail 3d, and the end portion 64b and the sloped portion 64c of the slider 6 engage with the insertion hole 71 of the hanger member 7. Therefore, the lock main body 8 coupled with the hanger member 7 is at the lock position P1. Namely, the lock main body 8 protrudes from the bottom of the housing 3 to engage with the steering shaft. As a result, rotation of the steering shaft is prohibited, and thereby an automobile is kept in an impossible state to be driven.

Note that, if the cover 2 is removed from the housing 3 after assembling, the boss 2a is got away from the boss plate 31, and then the boss plate 31 is moved toward the lock main body 8 by the boss spring 32. As a result, an end of the boss plate 31 engages with an engagement hole 8a on the lock main body 8. According to this, movement of the lock main body 8 along its axial direction is prohibited to keep a locked state of the steering shaft by the lock main body 8, so that antitheft security during parking can be improved.

Subsequently, when the motor 4 is rotated toward its unlock direction due to an output of an unlock signal, the rack 65 is driven by the drive gear 51 via the rotation axis 41, the worm gear 42 and the worm wheel 5. As a result, the slider 6 is moved from the lock end E1 toward the unlock end E2 along the guide rail 3d of the housing 3. Along with this, the hanger member 7 is moved by the sloped portion 64c under a state where the unlock portion 64d of the slider 6 is being contacted with the unlock portion 71a of the hanger member 7. As a result, the lock main body 8 is stroked in conjunction with the hanger member 7 so as to be distanced away from the steering shaft.

Subsequently, when the motor 4 is further rotated toward the unlock direction, established is an unlock state as shown in FIG. 3, FIG. 4, FIG. 7, FIG. 8 and FIG. 10(b) where the lock main body 8 is drawn into the housing 3 to be set at the unlock position P2, and thereby the automobile is made in a possible state to be driven. Here, the second detection switch 92 operates due to its contact with the first cam 62 and the third detection switch 93 operates due to its contact with the second cam 63 while the slider 6 slides toward the unlock end E2, so that it is detected that the lock main body 8 is at the unlock position P2 to establish a stand-by state possible to start an engine.

Subsequently, the worm wheel 5 is rotated toward its lock direction by the drive of the motor 4 for resetting to a locked state due to an output of a lock signal, so that the lock main body 8 is moved to the lock position P1 with following the slider 6. During this, the hanger member 7 and the lock main body 8 are being urged toward the steering column device A by the first coil spring 76 and the second coil spring 78. Therefore, the hanger member 7 is moved by the sloped portion 64c under a state where the lock portion 64e and the lock portion 71b are being contacted with each other, so that the lock main body 8 is moved toward the steering shaft. As a result, the lock main body 8 engages with the steering shaft to prohibit rotation of the steering shaft, and thereby the automobile is made in an impossible state to be driven. Here, if the lock main body 8 doesn't engage with any of engagement grooves on the steering shaft but contacts with outer surfaces between the engagement grooves, the steering shaft further rotates and thereby the lock main body 8 will engage with any of the engagement grooves on the steering shaft due to an urging force by the second coil spring 78 to prohibit a rotation of the steering shaft.

In the present embodiment, the hanger member 7 and the lock main body 8 are moved due to the sloped portion 64c linearly sloped toward the steering shaft along the slide direction of the slider 6 while the slider 6 slides, and thereby the lock main body 8 is stroked toward the steering shaft. Therefore, it is not needed to provide a spiral slope on a worm wheel to stroke a lock member as in a conventional way, so that a height along a stroke direction of the lock member can be made low to achieve downsizing. In addition, a stroke amount of the lock main body 8 and a driving force need for its stroke can be changed only by replacing the slider 6, so that cost reduction by commoditization of main components can be achieved.

According to the present embodiment, the worm wheel 5 is driven by the motor 4 and thereby rotates toward its lock direction or its unlock direction to drive the rack 65 provided on the slider 6, so that the slider 6 can be smoothly slid.

According to the present embodiment, the lock main body 8 is moved to engage with the steeing shaft while the slider 6 slides and thereby a rotation of the steering shaft is prohibited. In addition, if the lock main body 8 jams while stroking, the lock main body 8 will be forcebly moved by the slider 6 and thereby the lock main body 8 can moved unfailingly.

In the present embodiment, a stroke position of the lock main body 8 is detected by way of a position of the slider 6 by the detection switches 91 to 93 that operate in response to sliding of the slider 6. Therefore, the detection switches 91 to 93 can be disposed more easily than a case where the stroke position of the lock main body 8 is detected directly by a detection unit(s). Here, since the lock main body 8 follows a movement of the slider 6, the position of the lock main body 8 can be detected unfailingly. In addition, since the detection switches 91 to 93 are disposed along the side surfaces 64g of the slider 6, a height of an entire device along the stroke direction of the lock main body 8 can be restricted. Note that, if a detection unit(s) is made operated in response to a stroke of the lock main body 8, the height of the lock main body 8 along its stroke direction is relatively low, so that an installation location of the detection unit (s) is restricted and thereby installation of the detection unit(s) becomes difficult.

In the present embodiment, since the guide rail 3*d* of the housing 3 and the axial direction of the steering shaft are arranged "skew", a height of the slider 6 (i.e. a height along the stroke direction of the lock main body 8) that is guided by the guide rail 3*d* can be restricted. In addition, since an angle made between the guide rail 3*d* of the housing 3 and the axial direction (straight line L) of the steering shaft that are arranged "skew" is set to the predetermined angle $\alpha$ ($>0$), a length of the guide rail 3*d*, i.e. a stroke amount of the slider 6 can be made relatively longer than a case where the guide rail 3*d* and the axial direction (straight line L) of the steering shaft are parallel to each other in a space. Therefore, downsizing of the steering lock device 1 can be brought more efficiently. In addition, the stroke amount of the lock main body 8 can be prolonged by setting the sloped portion 64*c* of the slider 6 longer, or the drive force need for stroking the lock main body 8 can be increased by setting a sloped angle of the sloped portion 64*c* of the slider 6 smaller.

The invention claimed is:

1. A steering lock device comprising:
   a lock member that is slidable between a lock position at which the lock member engages with a steering shaft to prohibit a rotation of the steering shaft and an unlock position at which the lock member doesn't engage with the steering shaft to allow the rotation of the steering shaft; and
   a slider that is disposed slidably between a lock end and an unlock end in a direction perpendicular to a moving direction of the lock member,
   wherein
   the slider penetrates an opening in the lock member and variably contacts the lock member at a contact location,
   at least one of the lock member and the slider is provided at the contact location with a locking sloped portion that is linearly sloped toward the steering shaft along a slide direction of the slider,
   at least one of the lock member and the slider is provided at the contact location with an unlocking sloped portion that is linearly sloped toward the steering shaft along the slide direction of the slider, and
   the lock member is shifted to the lock position by contact with a locking sloped portion of the slider while the slider slides to the lock end, and
   the lock member is shifted to the unlock position by contact with an unlocking sloped portion of the slider while the slider slides to the unlock end.

2. The steering lock device according to claim 1, further comprising a detection unit that operates in response to sliding of the slider, wherein a position of the lock member is detected by an operation of the detection unit.

3. The steering lock device according to claim 1, wherein the slide direction of the slider is skew to an axial direction of the steering shaft.

4. The steering lock device according to claim 1, further comprising:
   a rack that is disposed on the slider along the slide direction of the slider; and
   a worm wheel that meshes with the rack and rotates toward an unlock direction or a lock direction by driving of a drive source.

5. The steering lock device according to claim 2, wherein the detection unit is disposed along a side surface of the slider.

* * * * *